(12) United States Patent
Berger et al.

(10) Patent No.: US 11,126,801 B2
(45) Date of Patent: Sep. 21, 2021

(54) 3D PRINTED IDENTIFICATION LABELS

(71) Applicant: Materialise N.V., Leuven (BE)

(72) Inventors: Jeroen Berger, Leuven (BE); Anca Fulger, Leuven (BE)

(73) Assignee: Materialise N.V., Leuven (BE)

( * ) Notice: Subject to any disclaimer, the term of this patent is extended or adjusted under 35 U.S.C. 154(b) by 0 days.

(21) Appl. No.: 16/624,871

(22) PCT Filed: Jul. 10, 2018

(86) PCT No.: PCT/US2018/041405
§ 371 (c)(1),
(2) Date: Dec. 19, 2019

(87) PCT Pub. No.: WO2019/014192
PCT Pub. Date: Jan. 17, 2019

(65) Prior Publication Data
US 2020/0134269 A1    Apr. 30, 2020

Related U.S. Application Data

(60) Provisional application No. 62/532,757, filed on Jul. 14, 2017.

(51) Int. Cl.
*G06K 19/06*       (2006.01)
*G06K 1/12*         (2006.01)
*G05B 19/4099*  (2006.01)

(52) U.S. Cl.
CPC ......... *G06K 1/121* (2013.01); *G05B 19/4099* (2013.01); *G06K 19/06037* (2013.01); *G06K 19/06159* (2013.01); *G05B 2219/49023* (2013.01)

(58) Field of Classification Search
USPC .......................................... 235/462.01, 494
See application file for complete search history.

(56) References Cited

U.S. PATENT DOCUMENTS

| 2002/0114701 A1* | 8/2002 | Coulson | B22C 9/04 |
| | | | 416/241 R |
| 2005/0121528 A1* | 6/2005 | Lubow | G06K 19/06037 |
| | | | 235/494 |
| 2007/0186417 A1* | 8/2007 | Smyth | G06K 7/14 |
| | | | 29/894 |
| 2011/0024505 A1* | 2/2011 | Wang | G06K 7/14 |
| | | | 235/462.41 |
| 2011/0210173 A1* | 9/2011 | Adams | G06K 7/12 |
| | | | 235/454 |
| 2015/0235069 A1* | 8/2015 | Kumar | B33Y 10/00 |
| | | | 235/462.09 |
| 2016/0260001 A1 | 9/2016 | Flores et al. | |

(Continued)

FOREIGN PATENT DOCUMENTS

| CN | 101916387 A | 12/2010 |
| FR | 3003374 A1 | 9/2014 |

(Continued)

*Primary Examiner* — Tuyen K Vo
(74) *Attorney, Agent, or Firm* — Patterson + Sheridan, LLP

(57) ABSTRACT

The present disclosure relates to identification labels (105). Described herein are designs for 3D identification labels on objects (100), and methods and systems for designing and manufacturing such objects (100) with 3D identification labels (105).

19 Claims, 15 Drawing Sheets

(56) References Cited

U.S. PATENT DOCUMENTS

2016/0321530 A1\* 11/2016 Troy ................. G06K 7/10881
2017/0232773 A1\* 8/2017 Kamijo ............... G06K 7/1491
235/462.01

FOREIGN PATENT DOCUMENTS

WO 0199040 A2 12/2001
WO 2017051999 A1 3/2017

\* cited by examiner

3D PRINTED IDENTIFICATION LABELS

CROSS-REFERENCE TO RELATED APPLICATIONS

This application claims priority to U.S. Provisional Patent No. 62/532,757 filed on 14 Jul. 2017. The content of this application is hereby incorporated by reference in its entirety.

BACKGROUND OF THE INVENTION

Field of the Invention

The present disclosure relates to identification labels. More particularly, the present disclosure relates to 3D identification labels on objects, and methods and systems for designing and manufacturing such objects with 3D identification labels.

Description of the Related Technology

Identification labels (e.g., barcodes), as the term is used herein, are optical, machine-readable representations of data. In certain aspects, the data represented in such an identification label is about the object the identification label is present on. Typical barcodes include linear or one-dimensional (1D) barcodes. In such barcodes, data is represented by dark flat parallel lines printed (e.g., using traditional ink printing) on a light flat surface. In particular, the varying width and spacings between the parallel lines represented the data. Further, barcodes include two-dimensional (2D) barcodes (e.g., data matrix barcode, quick response (QR) code, etc.), where flat geometric shapes or patterns (e.g., dots, rectangles, hexagons, etc.) are printed (e.g., using traditional ink printing) on a flat surface. The patterns represented the data.

Such traditional 1D and 2D barcode design suffers from a number of problems. For example, the barcode can only be read (e.g., using a scanning device such as a barcode scanner, a camera, a photosensor, etc.) from one side (i.e., the side the barcode is printed on). Further, the traditional barcode requires sufficient contrast between the color of the surface the barcode is printed on, and the color of the barcode itself, in order for the scanning device to read the barcode. In certain aspects, this may not be aesthetically pleasing, such as if the barcode is to be placed on a visible surface of an object. Accordingly, identification labels that solve the issues with traditional barcodes are desirable.

SUMMARY

The present disclosure relates to designs for 3D identification labels on objects, and methods and systems for designing and manufacturing such objects with 3D identification labels.

Certain embodiments provide a method of manufacturing an object using an additive manufacturing process. The method includes determining a location to place a 3D identification label on the object, wherein the 3D identification label comprises a pattern indicative of an encoding of one or more specifications of the object; including metadata of the 3D identification label at the location in a 3D model of the object; generating slices of the 3D model of the object; generating a geometry of the 3D identification label from the metadata based on the slices of the 3D model of the object; and manufacturing the object based on the slices and the geometry of the 3D identification label.

Certain embodiments provide a method of reading a 3D identification label on an object. The method includes providing a backlight on a reference surface of the object, wherein the reference surface comprises the 3D identification label on or under, at least one of a first side and a second side of the reference surface, wherein the 3D identification label is formed as a pattern on or under the first side of the reference surface; capturing an image of the 3D identification label from a side of the reference surface opposite a side the backlight is provided on; and determining one or more specifications of the object encoded in the pattern based on the captured image of the 3D identification label.

Certain embodiments provide an object. The object includes a reference surface; and a 3D identification label on both a first side and a second side of the reference surface, wherein the 3D identification label comprises a first raised surface formed as a pattern on the first side of the reference surface and a second raised surface formed as the pattern on the second side of the reference surface, wherein the first side is opposite the second side of the reference surface, wherein each point of the first raised surface on the first side of the reference surface is positioned at the same coordinates in a plane defined by the reference surface as each point of the second raised surface on the second side of the reference surface, and wherein the pattern is indicative of an encoding of one or more specifications of the object.

Certain embodiments provide an object. The object includes a reference surface; and a 3D identification label under a first side and a second side of the reference surface, wherein the 3D identification label comprises a pattern formed under the first side and the second side of the reference surface, wherein the first side is opposite the second side of the reference surface, and wherein the pattern is indicative of an encoding of one or more specifications of the object.

Certain embodiments provide a computing device including a memory and a processor configured to perform the steps of any of the described methods. Further, certain embodiments provide a non-transitory computer readable medium having instructions stored thereon that when executed by a computing device cause the computing device to perform any of the described methods.

DETAILED DESCRIPTION OF INVENTION

Figure 1A:
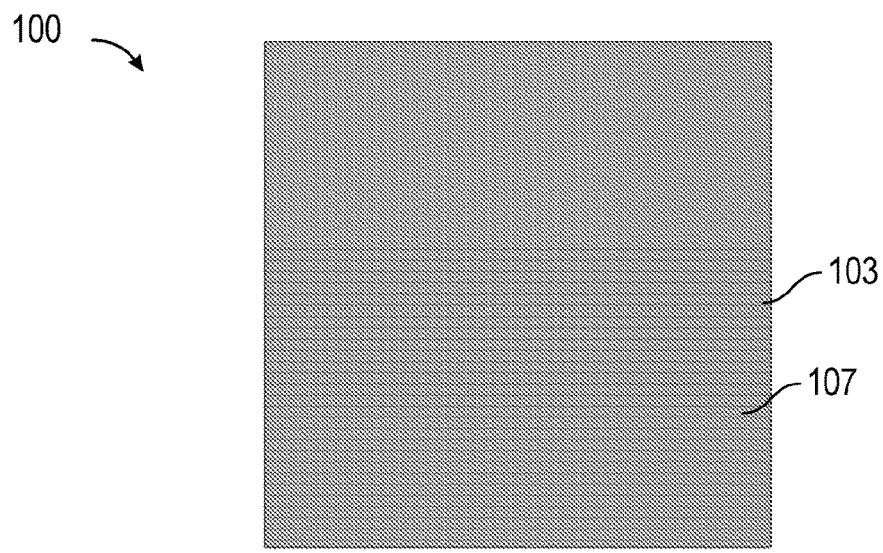
FIG. 1A is a bottom view of an example of a 3D identification label, according to certain aspects.
Figure 1B:
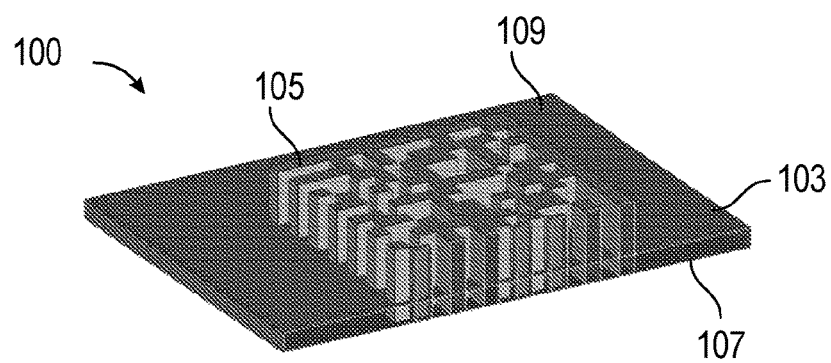
FIG. 1B is an isometric slice view of the example of the 3D identification label of FIG. 1A, according to certain aspects.
Figure 1C:
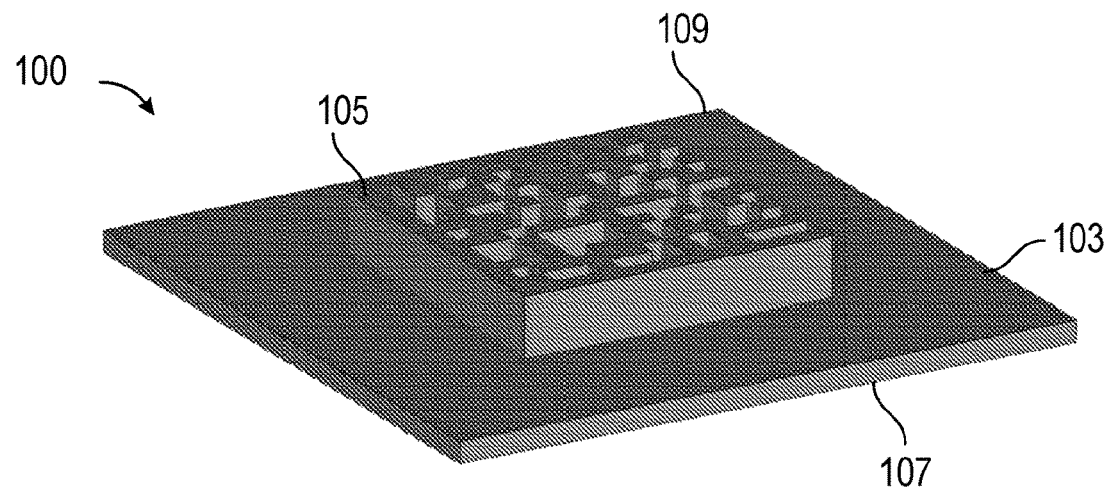
FIG. 1C is an isometric view of the example of the 3D identification label of FIG. 1A, according to certain aspects.
Figure 1D:
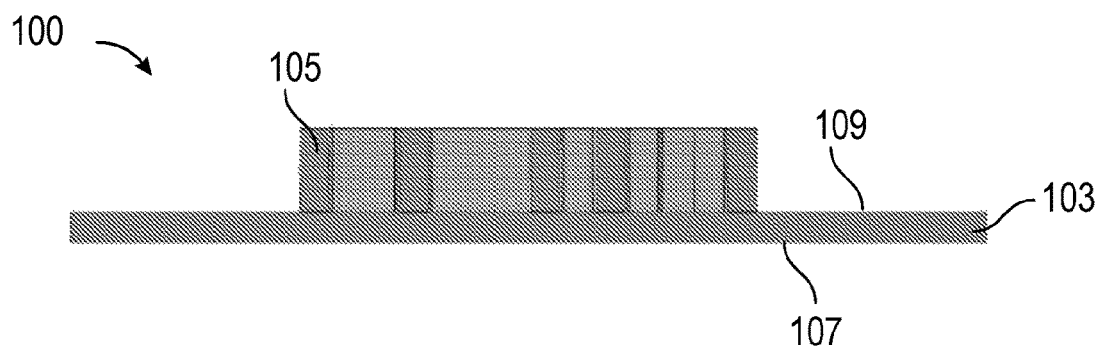
FIG. 1D is a side slice view of the example of the 3D identification label of FIG. 1A, according to certain aspects.
Figure 1E:
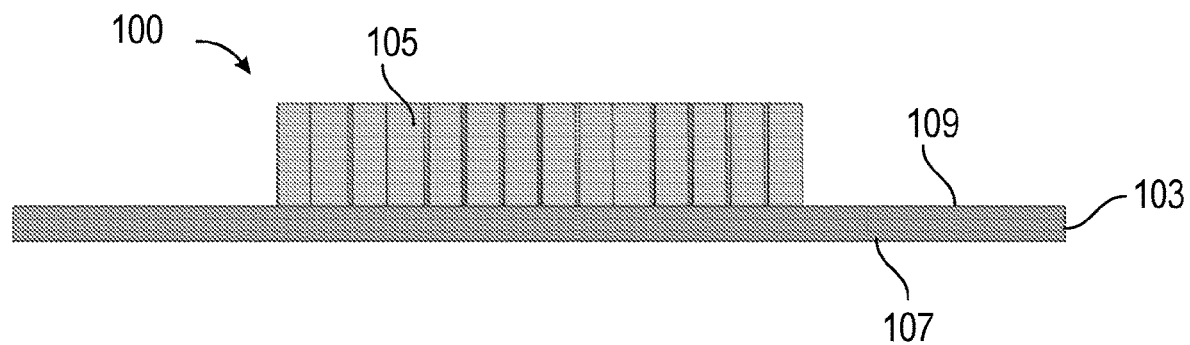
FIG. 1E is a side view of the example of the 3D identification label of FIG. 1A, according to certain aspects.
Figure 1F:
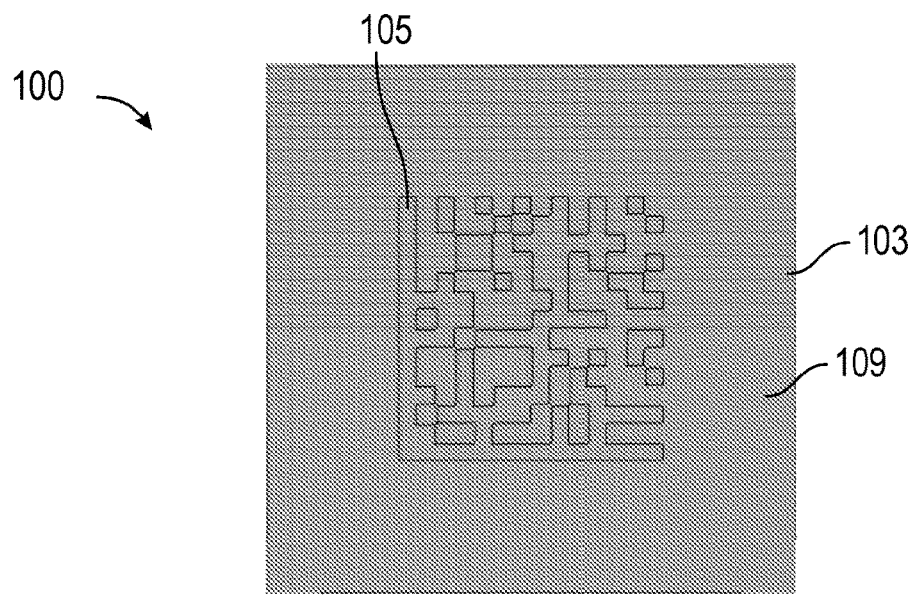
FIG. 1F is an top view of the example of the 3D identification label of FIG. 1A, according to certain aspects.
Figure 2A:
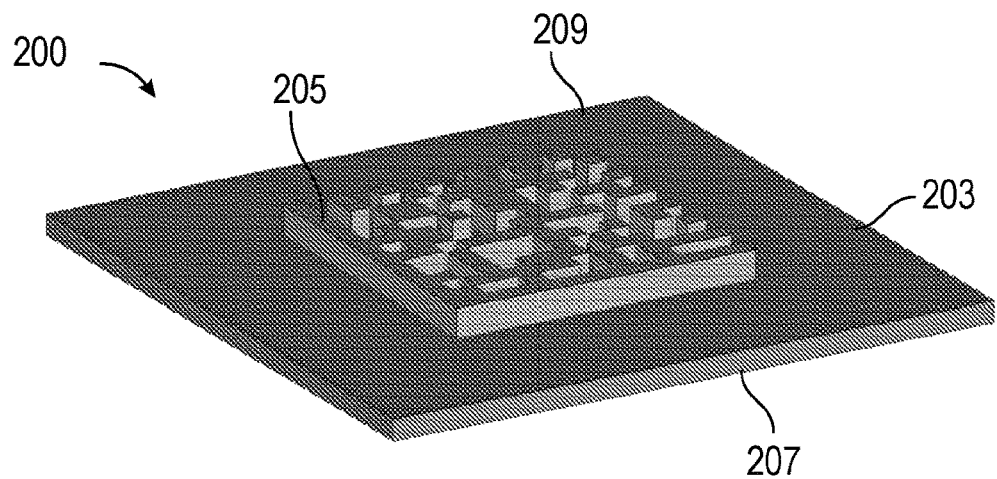
FIG. 2A is an isometric view of another example of a 3D identification label, according to certain aspects.
Figure 2B:
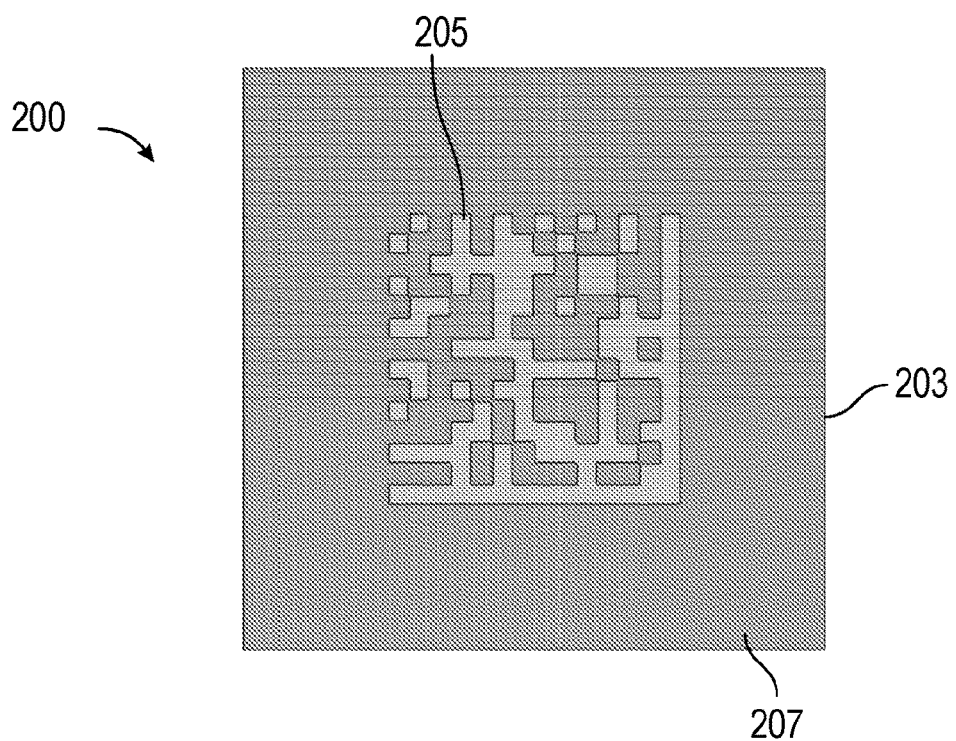
FIG. 2B is a bottom view of the example of the 3D identification label of FIG. 2A, according to certain aspects.
Figure 2C:
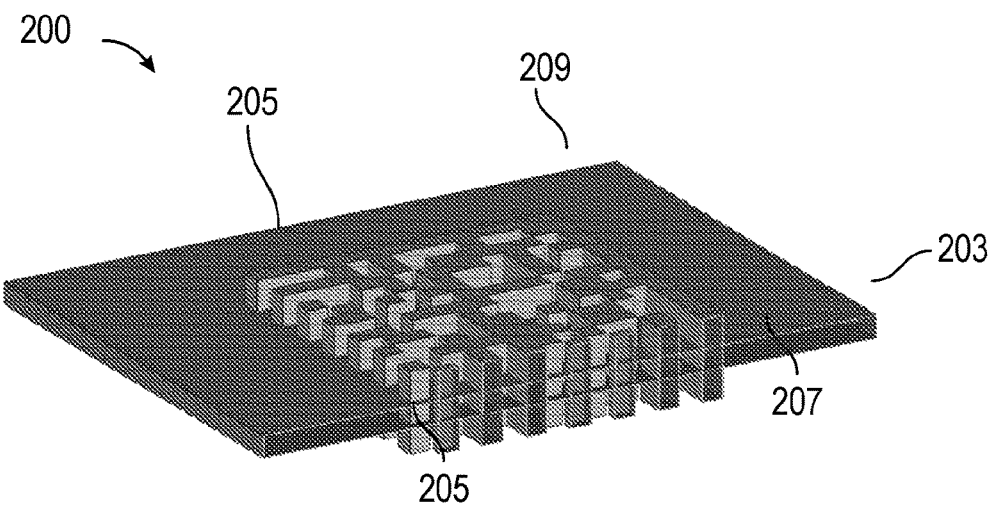
FIG. 2C is an isometric slice view of the example of the 3D identification label of FIG. 2A, according to certain aspects.
Figure 2D:
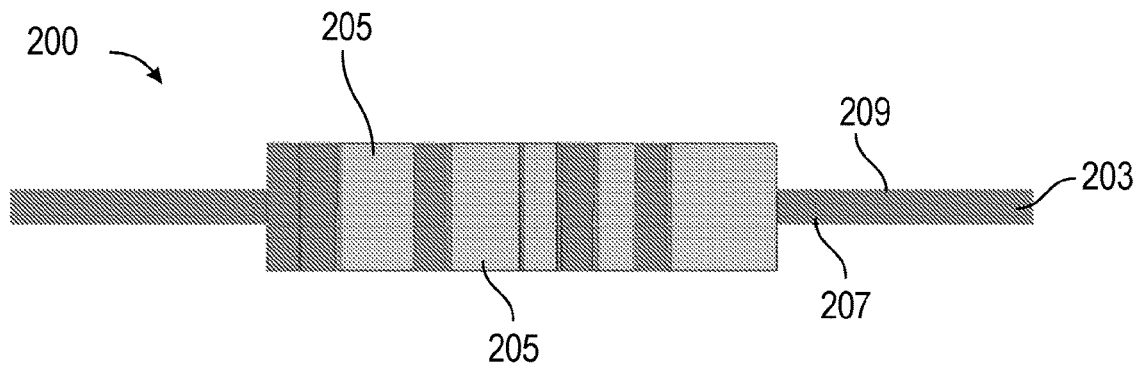
FIG. 2D is a side slice view of the example of the 3D identification label of FIG. 2A, according to certain aspects.
Figure 2E:
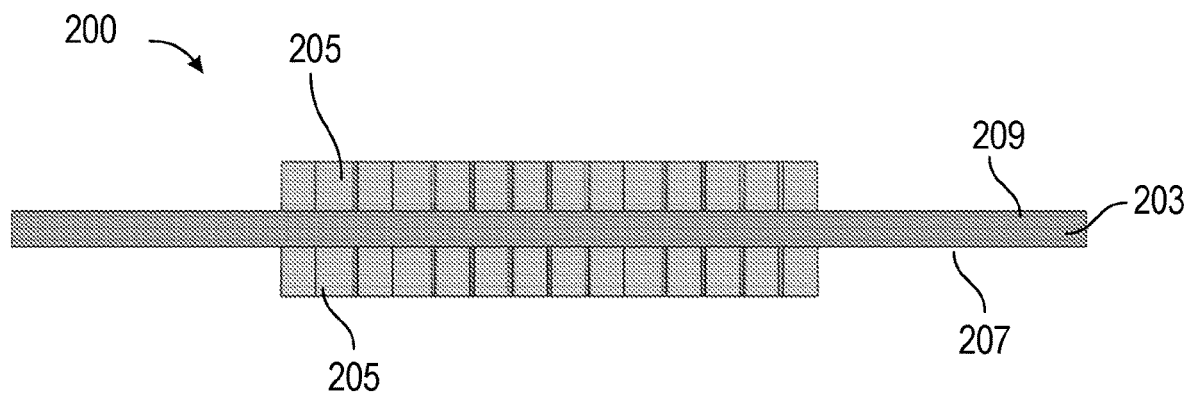
FIG. 2E is a side view of the example of the 3D identification label of FIG. 2A, according to certain aspects.
Figure 2F:
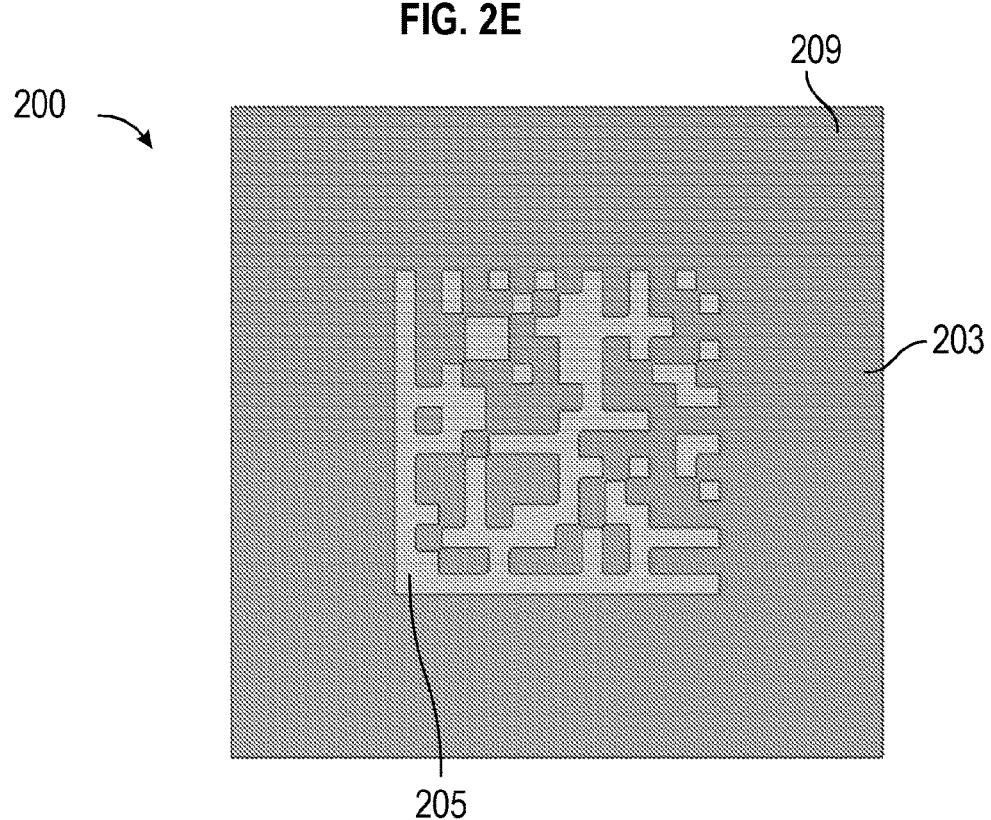
FIG. 2F is an top view of the example of the 3D identification label of FIG. 2A, according to certain aspects.

The following description and the accompanying figures are directed to certain specific embodiments. The embodiments described in any particular context are not intended to limit this disclosure to the specified embodiment or to any particular usage. Those of skill in the art will recognize that the disclosed embodiments, aspects, and/or features are not limited to any particular embodiments. For example, reference to "a" layer, component, part, etc., may, in certain aspects, refer to "one or more."

Described herein are designs for 3D identification labels (e.g., 3D barcodes). In certain aspects, the 3D identification label includes a raised surface, comprising one or more geometric shapes or patterns (e.g., dots, rectangles, blocks, hexagons, parallel lines, etc.), that is formed on a reference surface (e.g., a flat surface, curved surface, uneven surface, etc.). Certain aspects are described with respect to a flat surface as a reference surface with a raised surface that is formed above the reference surface. However, one of skill in the art should understand that the reference surface may not necessarily be a flat surface and may be another surface type (e.g., uneven, curved, etc.) on which a raised surface is formed. The design of the raised surface including geometric shapes or patterns represents data. In certain aspects, the 3D identification label includes raised surfaces on two opposite sides of the reference surface. The raised surface on each side of the reference surface are aligned with each other, such that they form a contiguous geometric shape or pattern from one side of the reference surface to another side of the reference surface (e.g., with the reference surface intersecting the contiguous geometric shape). Since the raised surface is formed on the reference surface, the geometric shape or pattern forming the 3D identification label is thicker than the reference surface it is formed on. Accordingly, based on the material (e.g., density of material) and/or color of material used for the reference surface and raised surface, the contrast between the raised surface and the reference surface on each side of the reference surface is enhanced, thereby making reading the 3D identification label easier using a scanning device (e.g., a barcode scanner, a camera, a photosensor, an X-ray machine, etc.). Further, where the raised surface is on both sides of a reference surface, the 3D identification label can be read from either side of the reference surface, and the contrast between the raised surface and reference surface may further be enhanced due to the additional thickness of the contiguous geometric shape or pattern including both raised surfaces. In certain aspects, the reference surface is not included, and instead the raised surfaces are coupled together at only a few points (e.g., around the edges of the raised surfaces) and instead of the reference surface there is an empty space.

In certain aspects, the 3D identification label comprises one or more geometric shapes or patterns (e.g., dots, rectangles, blocks, hexagons, parallel lines, etc.) of different heights. For example, different portions of the 3D identification label may have different heights, which may be distinguishable by a scanning device (e.g., portions of greater height may be made of more material and have a darker shade or contrast). The different heights may correspond to different data represented by the 3D identification label. In some such aspects, raised surfaces on opposite sides of the reference surface may be asymmetrical and represent the same or different data.

In certain aspects, the 3D identification label comprises one or more geometric shapes or patterns (e.g., dots, rectangles, blocks, hexagons, parallel lines, etc.) having different contrast coatings. For example, different portions of the 3D identification label may have different coatings thereon that change the shade or contrast of each portion, which may be distinguishable by a scanning device. The different contrast coatings may correspond to different data represented by the 3D identification label. For example, though in certain aspects, different materials are discussed as being used for different portions of a 3D identification label, additionally or alternatively, different contrast coatings may be used for such portions.

In certain aspects, the 3D identification label comprises one or more geometric shapes or patterns (e.g., dots, rectangles, blocks, hexagons, parallel lines, etc.) of different densities. In certain aspects, the geometric shapes or patterns of different densities include raised surfaces as described. In certain aspects, the geometric shapes or patterns of different densities include material that is under the outer surface (e.g., reference surface) of an object and may not be "visible" (e.g., to the naked eye). For example, the material in the object at a location of the 3D identification label may be generated with different densities representing the 3D identification label. In certain aspects, an X-ray device, ultrasound, or other appropriate scanning device may be used to measure the different densities to read the 3D identification label. Differences in parts of the 3D identification label may also be detected using a thermal imaging device or infrared device. In certain aspects, a difference in densities may result from a sintered 3D identification label comprising a raised or engraved surface, as contrasted with unsintered powder surrounding the 3D identification label.

In certain aspects, instead of raised surfaces above a reference surface, the 3D identification label comprises one or more lowered surfaces that recess into the reference surface, similar to the raised surfaces, but inverted. In certain aspects, similar to the raised surfaces, the lowered surfaces may be on each side of the reference surface and aligned with each other, such that they form a contiguous geometric shape or pattern from one side of the reference surface to another side of the reference surface (e.g., with the reference surface intersecting the contiguous geometric shape).

In certain aspects, a 3D identification label may (whether on a raised surface or on an engraved surface) may appear darker in shading than the reference surface, due to a difference in color, contrast, density, material, or other factors as described herein. Alternatively, a 3D identification label may appear lighter in shading than the reference surface.

In certain aspects, a 3D identification label may comprise a surface texture that comprises information, such as a unique texture that corresponds to information about an object or may be linked to a specific object. Surface textures may comprise patterns and/or pictures. In certain aspects, a surface texture may comprise Braille. Surface textures may be imaged, or may be measured by any means for determining and/or mapping surface roughness.

In certain aspects, the 3D identification label comprises two or more colors. The colors may be applied to the object during or after manufacturing, for example by painting or dyeing the object. Colors may be manufactured as part of the object, for example, by using differently colored build materials, or materials that differ in composition. Shades of colors may be applied to the object, or may be visible under certain lighting conditions, such as blacklight.

In certain aspects, the 3D identification label may comprise more than one material. The 3D identification label may comprise two or more types of plastic or two or more types of metal, or a combination of plastic and metal. In certain aspects, the 3D identification label may be an RFID tag that is manufactured from a combination of metal and plastic, for example, by using a build material comprising plastic and metal. After manufacturing, parts of the metal or plastic may be removed or refined by post-finishing. In certain aspects, the 3D identification label comprises carbon fibers, or a material impregnated with carbon fibers.

Further described herein are systems and methods for manufacturing an object including a 3D identification label, and systems and methods for reading a 3D identification label. In certain aspects, the 3D identification label is manufactured as part of an object using an additive manufacturing AM process. A 3D identification label may be manufactured separately from the object and attached during or after manufacturing. In certain aspects, the 3D identification label is manufactured near an object or on structures associated with the object. For example, the 3D identification label may be manufactured as part of a box around one or more objects, and the label may contain information about the one or more objects. In additive manufacturing processes such as powder bed fusion processes, this type of box may be manufactured around the one or more objects so that the box may be lifted out of the powder bed and the one or more objects will be contained in the box. The 3D identification label may be manufactured on a support structure that provides physical support and/or a means for heat dissipation to an object during the additive manufacturing process. In certain aspects, the 3D identification label may be a break-off tag that connects to the object, box, or support through a bridge. The bridge may be configured to break easily, for example, if the bridge is a thin structure like a single column or a lattice structure comprising beams. The break-off tag may be connected to one location on an object, box, or support, or may be connected at multiple locations, for example, through multiple bridges.

AM processes are a material-addition approach to building parts, typically starting from a base material in liquid, solid sheet or powder form and consolidating the added material locally, in layer-by-layer fashion. Since the emergence of the first AM processes in the early 1990's, AM processes have been used as an alternative to conventional material-removal techniques such as milling, cutting or drilling or molding techniques, such as injection molding or extrusion molding, and have been shown to be especially effective in producing complex parts in a relatively short time, without dedicated tools such as molds or dies.

Among the best-known AM techniques are stereolithography (SLA), 3D-printing (3D-P), Selective Laser Sintering (SLS), Selective Heat Sintering (SHS), Selective Laser Melting (SLM), Direct Metal Laser Sintering (DMLS), Laser Beam Melting (LBM), and Electron Beam Melting (EBM). The techniques vary according to the tools used for consolidating the layers of a part, and according to materials that can be used in the techniques.

The systems and methods described herein may be performed using various additive manufacturing and/or three-dimensional (3D) printing systems and techniques. Typically, additive manufacturing techniques start from a digital representation (e.g., CAD file, such as STL, DWG, DXF, etc., mesh based model, voxel based model, etc.) of the 3D object to be formed. Generally, the digital representation is divided into a series of cross-sectional layers (e.g., perpendicularly to the Z-direction, meaning parallel to a build platform), or "slices," which are overlaid to form the object as a whole. The layers represent the 3D object, and may be generated using additive manufacturing modeling software executed by a computing device. For example, the software may include computer aided design and manufacturing (CAD/CAM) software. Information about the cross-sectional layers of the 3D object may be stored as cross-sectional data. An additive manufacturing (e.g., 3D printing) machine or system utilizes the cross-sectional data for the purpose of building the 3D object on a layer by layer basis. Accordingly, additive manufacturing allows for fabrication of 3D objects directly from computer generated data of the objects, such as computer aided design (CAD) files or STL files. Additive manufacturing provides the ability to quickly manufacture both simple and complex parts without tooling and without the need for assembly of different parts.

Additive manufacturing processes generally include providing energy from an energy source (e.g., a laser, an electron beam, etc.) to solidify (e.g., polymerize) layers of building material (e.g., plastic, metal, etc.). For example, the additive manufacturing machine may selectively apply energy from an energy source to (e.g., scan) the building material based on a job file. The job file may include information regarding slices of a digital representation of an object or objects to be built using an additive manufacturing process. For example, 3D objects represented by CAD files may be arranged in a virtual build volume corresponding to the build volume of an additive manufacturing device. Optionally, support structures may be added to the 3D objects in the virtual build volume (e.g., to improve build quality, heat dissipation, reduce deformation, etc.) The resulting 3D objects may be divided into layers or slices, as discussed. The job file, accordingly, may include slices (e.g., a stack of slices) of the 3D objects, and parameters of the additive manufacturing machine for building the 3D objects.

For example, for each slice, the job file may include information regarding a scanning pattern for the energy source to apply energy to (e.g., laser to scan, electron beam to scan, etc.) the physical layer of building material corresponding to that slice. It should be noted that as discussed herein, the terms slice and layer may be used interchangeably. The scanning pattern may include one or more vectors that each indicates a spatial position to apply the energy to the layer of building material and a direction to apply the energy to the building material (e.g., a direction to move the laser beam, electron beam, or other energy source over the building material while scanning).

An additive manufacturing machine builds an object on a layer by layer basis by applying energy to (e.g., scanning) the layers of building material according to the scanning pattern for each individual layer as indicated in a job file. For example, the additive manufacturing machine may scan a first layer of physical building material corresponding to a first slice of a digital representation of an object according to the scanning pattern for the first slice. The additive manufacturing machine may then scan a second layer of building material corresponding to a second slice adjacent to the first slice according to the scanning pattern for the second slice. The additive manufacturing machine continues scanning layers of building material corresponding to all the slices in the job file, until the layer corresponding to the last slice is scanned.

FIGS. 1A-1F illustrate an example of a 3D identification label 105, according to certain aspects. As shown, the 3D identification label 105 is formed on a flat surface 103 of an object 100. As discussed, in certain aspects, flat surface 103 may not be a flat surface, but a different type of reference surface. On one side 107 of the flat surface 103, no pattern or shape corresponding to the 3D identification label 105 is formed. However, on the other side 109 of the flat surface 103, a pattern corresponding to the 3D identification label 105 is formed. Accordingly, 3D identification label 105 is an example of a 1-sided 3D identification label. The 3D identification label 105 is formed as a raised surface on the flat surface 103. In particular, a height of the 3D identification label 105 is greater than a height of the flat surface 103. In certain aspects, different portions of the raised surface of the 3D identification label 105 may have different heights. Further, in certain aspects, the different heights (unlike 1D and 2D barcodes), shapes, and/or patterns (e.g., as discussed with respect to 1D and 2D barcodes) of the 3D identification label 105 may be representative of different data. For example, different patterns within the XY plane substantially parallel to the flat surface 103 and/or different heights for the pattern in the Z direction substantially perpendicular to the flat surface 103 may be representative of different data.

In certain aspects, a thickness of the material in the Z direction substantially perpendicular to the flat surface 103 of the flat surface 103 as shown, is less than a thickness of the 3D identification label 105 formed on the flat surface 103. For example, the 3D identification label 105 material includes the corresponding material that forms the flat surface 103, and in addition the material for the raised surface above the flat surface 103. In certain aspects, the flat surface 103 is thin enough (e.g., 0.8 mm or less) that there is sufficient contrast between the 3D identification label 105 and the flat surface 103 to read the 3D identification label 105 using a scanning device. In certain aspects, the minimum thickness of the flat surface 103 may be limited based on the additive manufacturing process/machine used to manufacture the 3D identification label 105. For example, the flat surface 103 may be approximately at least 0 mm to 0.4 mm. Further, in certain aspects, the material of the 3D identification label 105 and flat surface 103 is of a type (e.g., density, color, etc.) that there is sufficient contrast between them based on the thickness of each. For example, in certain aspects, the material comprises polyamide 12 (PA12) or any other materials used for laser sintering. In certain aspects, the material of the 3D identification label 105 and the flat surface 103 is the same, such as to enhance aesthetics or ease of manufacturing. In certain aspects, the material of the 3D identification label 105 and the flat surface 103 is different, such as to enhance contrast. In certain aspects, the color of the 3D identification label 105 and the flat surface 103 is the same, such as to enhance aesthetics or ease of manufacturing. In certain aspects, the color of the 3D identification label 105 and the flat surface 103 is different, such as to enhance contrast. In certain aspects, the 3D identification label 105 (e.g., portions thereof) are coated with a contrast coating as discussed.

In certain aspects, the flat surface 103 is thin enough (e.g., 0.8 mm or less) and/or made of a material (e.g., of a low density, light color, etc.) such that the flat surface 103 is at least partially translucent. For example, in certain aspects, the material comprises polyamide 12 (PA12) or any other materials used for laser sintering. Further, the 3D identification label 105 may be thick enough (e.g., more than 0.8 mm) and/or mode of a material (e.g., of a high density, dark color, etc.) such that the 3D identification label 105 is not translucent, opaque, or less translucent than the flat surface 103. In such aspects, backlighting (from either side 107 or 109) can be used to enhance contrast between the flat surface 103 and the 3D identification label 105 (on the other of side 107 or 109) for better reading (on the other of side 107 or 109) by a scanning device. In particular, in certain aspects, the backlighting causes the flat surface 103 to be illuminated and light to pass through to the other side of the flat surface 103 from which the backlighting is provided. In certain aspects, the flat surface 103 may be made of a lighter color (e.g., white) material, to further enhance translucence. Further, in certain aspects, with such a translucent flat surface 103, in addition to the scanning device being able to read the 3D identification label 105 from the side 109 including the raised surface, the scanning device can also read the 3D identification label 105 from the side 107 not including the raised surface, based on the contrast difference between the flat surface 130 and the 3D identification label 105 visible from side 107.

In certain aspects, front lighting (on side 109) may be used to enhance contrast between the flat surface 103 and the 3D identification label 105 for better reading (on side 109) by a scanning device. In certain aspects, the flat surface 103 may be made of a darker color (e.g., black) material, or a more opaque material, to further enhance contrast with front lighting. In certain aspects, the flat surface 103 may be made of a denser material, to further contrast with front lighting. In certain aspects, an electronic tag (e.g., RFID tag) may be embedded in flat surface 103. The electronic tag may include the same data as 3D identification label 105, different data, additional data, etc. Accordingly, the electronic tag may allow another method for reading data from the 3D identification label 105 (e.g., using an RFID reader).

In certain aspects, as discussed, the 3D identification label 105 may include recessions (not shown) into the flat surface 103 instead of a raised surface over the flat surface 103. In some such aspects, the form of the flat surface 103 and the recessed surface may be reversed (e.g., the flat surface 103 is not translucent, opaque, or less translucent, and the recessed surface is at least partially translucent.

In certain aspects, as discussed, the 3D identification label 105 may include areas of different density under the flat surface 103 (not shown) instead of a raised surface over the flat surface 103. In some such aspects, the 3D identification label 105 may not be visible to the naked eye below the flat surface 103.

In certain aspects, as discussed, the raised surfaces of the 3D identification label 105 do not include the flat surface 103 between them, but instead are coupled together at only a few points (e.g., around the edges of the raised surfaces) and instead of the flat surface 103 there is an empty space.

FIGS. 2A-2F illustrate an example of another 3D identification label 205, according to certain aspects. 3D identification label 205 is similar to 3D identification label 105, except that 3D identification label 205 is formed on both sides of a flat surface 203 (or a different type of reference surface as discussed). Accordingly, 3D identification label 205 is an example of a 2-sided 3D identification label.

As shown, the 3D identification label 205 is formed on a flat surface 203 of an object 200. On both sides 207 and 209 of the flat surface 203, a pattern corresponding to the 3D identification label 205 is formed as a raised surface (e.g., a first raised surface and a second raised surface), respectively. In some aspects, the raised surface of 3D identification label 205 on side 207 is of the same pattern, height(s), etc. as the raised surface of 3D identification label 205 on side 209. Further, as shown, the raised surface of the 3D identification label 205 on each of side 207 and 209 together form a contiguous piece, such that the raised surfaces align with respect to flat surface 203 between the raised surfaces. For example, each point of the first raised surface on the first side 207 of the flat surface 203 is positioned at the same coordinates in a plane defined by the flat surface 203 as each point of the second raised surface on the second side 209 of the flat surface 203. Similar to 3D identification label 105, each of the raised surfaces of the 3D identification label 205 has a height that is greater than a height of the flat surface 203. In certain aspects, different portions of the raised surfaces of the 3D identification label 205 may have different heights. Further, in certain aspects, the different heights (unlike 1D and 2D barcodes), shapes, and patterns (e.g., as discussed with respect to 1D and 2D barcodes) of each of the raised surfaces of the 3D identification label 205 may be representative of different data. For example, different patterns within the XY plane substantially parallel to the flat surface 203 and/or different heights for the pattern in the Z direction substantially perpendicular to the flat surface 203 may be representative of different data. Further, each of the raised surfaces of the 3D identification label 205 represent the same data.

In certain aspects, a thickness of the material in the Z direction substantially perpendicular to the flat surface 203 of the flat surface 203 as shown, is less than a thickness of each of the raised surfaces of the 3D identification label 205 formed on the flat surface 203. For example, the 3D identification label 205 material includes the corresponding material that forms the flat surface 203, and in addition the material for the raised surfaces above the flat surface 203. In certain aspects, the flat surface 203 is thin enough (e.g., 0.8 mm or less) that there is sufficient contrast between each of the raised surfaces of the 3D identification label 205 and the flat surface 203 to read the 3D identification label 205 from either of side 207 or side 209 using a scanning device. Further, in certain aspects, the material of the 3D identification label 205 and flat surface 203 is of a type (e.g., density, color, etc.) that there is sufficient contrast between them based on the thickness of each. In certain aspects, the material of the 3D identification label 205 and the flat surface 203 is the same, such as to enhance aesthetics or ease of manufacturing. In certain aspects, the material of the 3D identification label 205 and the flat surface 203 is different, such as to enhance contrast. In certain aspects, the color of the 3D identification label 205 and the flat surface 203 is the same, such as to enhance aesthetics or ease of manufacturing. In certain aspects, the color of the 3D identification label 205 and the flat surface 203 is different, such as to enhance contrast.

In certain aspects, the flat surface 203 is thin enough (e.g., 0.8 mm or less) and/or made of a material (e.g., of a low density, light color, etc.) such that the flat surface 203 is at least partially translucent. Further, the 3D identification label 205 may be thick enough (e.g., more than 0.8 mm) and/or mode of a material (e.g., of a high density, dark color, etc.) such that the 3D identification label 205 is not translucent, opaque, or less translucent than the flat surface 203. In such aspects, backlighting (from either side 207 or 209) can be used to enhance contrast between the flat surface 203 and the 3D identification label 205 (on the other of side 207 or 209) for better reading (on the other of side 207 or 209) by a scanning device. In particular, in certain aspects, the backlighting causes the flat surface 203 to be illuminated and light to pass through to the other side of the flat surface 203 from which the backlighting is provided. In certain aspects, the flat surface 203 may be made of a lighter color (e.g., white) material, to further enhance translucence. In certain aspects, having the raised surfaces of the 3D identification label 205 on both sides of the flat surface 203 allows the 3D identification label 205 to be read with better contrast from either side 207 or 209 of the flat surface 203, when backlighting is used, than 3D identification label 105.

In certain aspects, front lighting (on either of side 207 or 209) may be used to enhance contrast between the flat surface 203 and the 3D identification label 205 for better reading (on the either of side 207 or 209) by a scanning device. In certain aspects, the flat surface 203 may be made of a darker color (e.g., black) material, or more opaque material, to further enhance contrast with front lighting. In certain aspects, the flat surface 203 may be made of a denser material, to further enhance contrast with front lighting. In certain aspects, having the raised surfaces of the 3D identification label 205 on both sides of the flat surface 203 allows the 3D identification label 205 to be read from either side 207 or 209 of the flat surface 203, even when the flat surface 203 is front lit or more opaque, unlike 3D identification label 105. In certain aspects, the flat surface 203 may be made of a lighter color, or a less opaque material, to further enhance contrast with the 3D identification label.

In certain aspects, an electronic tag (e.g., RFID tag) may be embedded in flat surface 203. The electronic tag may include the same data as 3D identification label 205, different data, additional data, etc. Accordingly, the electronic tag may allow another method for reading data from the 3D identification label 205 (e.g., using an RFID reader).

In certain aspects, as discussed, the 3D identification label 205 may include recessions (not shown) into the flat surface 203 on each side 207 and 209 of the flat surface 203 instead of raised surfaces over the flat surface 203. In some such aspects, the form of the flat surface 203 and the recessed surfaces may be reversed (e.g., the flat surface 203 is not translucent, opaque, or less translucent, and the recessed surfaces are at least partially translucent.

In certain aspects, as discussed, the 3D identification label 205 may include areas of different density under the flat surface 203 (not shown) instead of raised surfaces over the flat surface 203.

In certain aspects, as discussed, the raised surfaces of the 3D identification label 205 do not include the flat surface 203 between them, but instead are coupled together at only a few points (e.g., around the edges of the raised surfaces) and instead of the flat surface 203 there is an empty space.

Figure 3A:
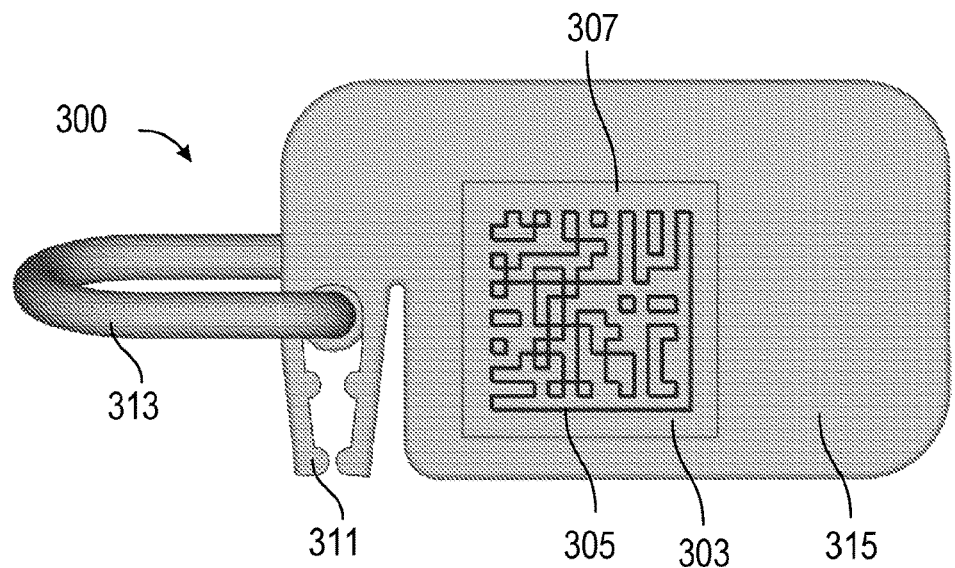
FIG. 3A is an isometric view of an example of a tag including a 3D identification label, according to certain aspects.
Figure 3B:
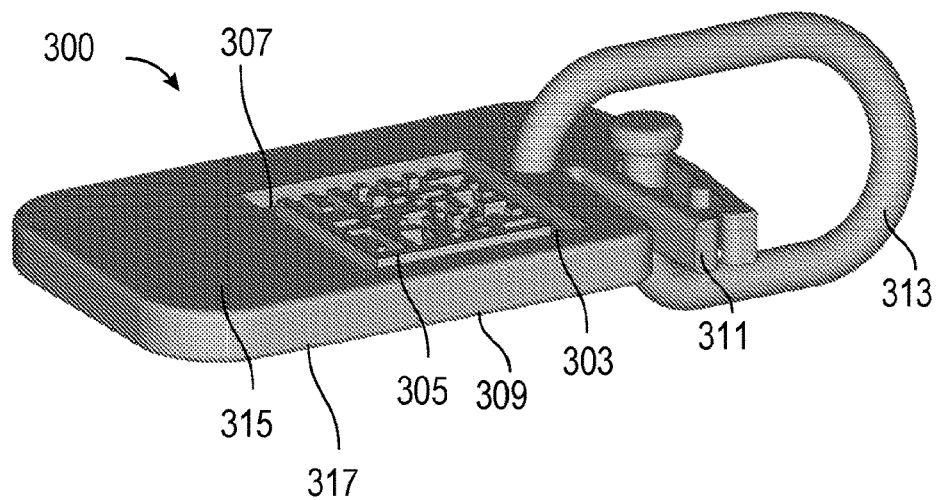
FIG. 3B is a bottom view of the example of the tag of FIG. 3A, according to certain aspects.
Figure 3C:
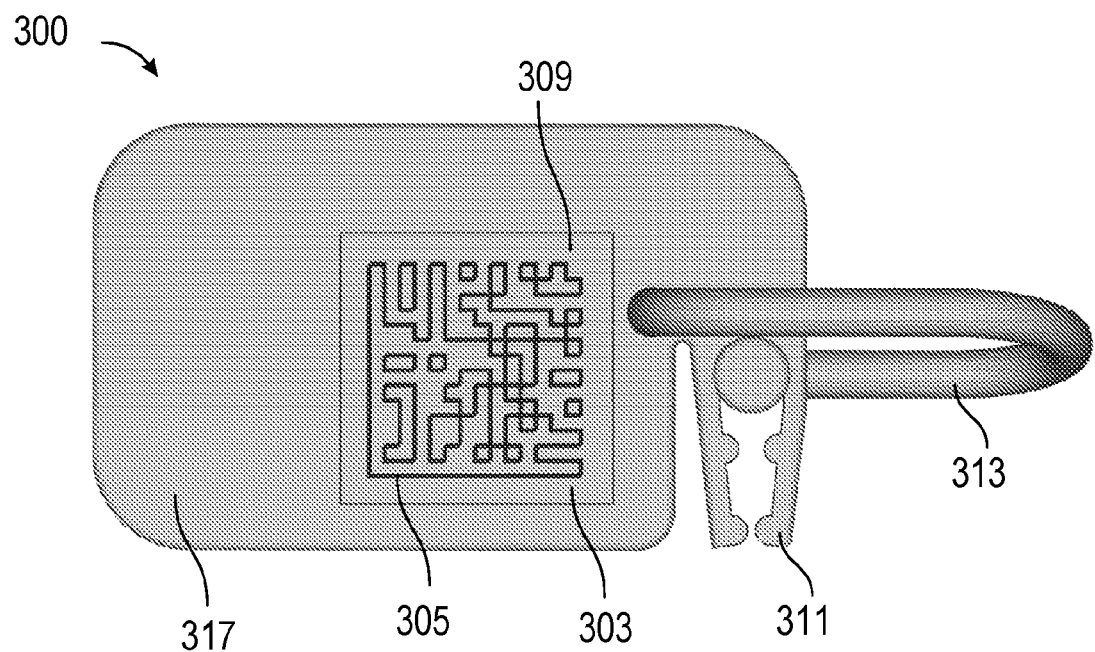
FIG. 3C is a top view of the example of the tag of FIG. 3A, according to certain aspects.

FIGS. 3A-3C illustrate an example of a tag 300 including a 3D identification label 305, according to certain aspects. In certain aspects, as shown, the 3D identification label 305 is a 2-sided identification label, such as similar to 3D identification label 205. In certain aspects (not shown), the 3D identification label 305 is a 1-sided identification label, such as similar to 3D identification label 105. In certain aspects, the 3D identification label 305 includes recession(s), areas of different density under a reference surface, such as a flat surface, or does not include a reference surface (not shown), as discussed.

As shown, the tag 300 includes a flat surface 303, including sides 307 and 309, similar to flat surface 103 or 203. Further, identification label 305 includes raised surfaces on sides 307 and 309 of flat surface 303, similar to identification label 205. In addition, as shown, the flat surface 303 is at a depth on the tag 300 that is lower (i.e., inset) on side 307 than a top surface 315 of the tag 300, and lower on side 309 than a top surface 317 of the tag 300. Further, the raised surfaces of the identification label 305 are lower than the top surface 315 and top surface 317 of the tag 300, respectively. In certain aspects (not shown) one or both of the raised surfaces of the identification label 305 are substantially flush or higher than the top surface 315 and top surface 317 of the tag 300, respectively. In certain aspects (not shown), one or both of sides 307 and 309 of the flat surface 303 is substantially flush or higher than the top surface 315 and top surface 317 of the tag 300, respectively. Further, such designs of the flat surface 303 and identification label 305 may be similarly used for other objects besides tag 300.

In certain aspects, tag 300 includes a connector 313 for coupling or connecting to another object. For example, as shown, connector 313 is a loop which may hook onto another object. Accordingly, in some aspects, the identification label 305 of tag 300 may represent data about the object the tag 300 couples to. The connector 313 is shown coupled to the tag 300 by an interface 311. The interface 311 may be configured to be flexible and open when force is applied to enable connector 313 to be inserted into interface 311. Once connector 313 is inserted, interface 311 may close and secure the connector 313 in place. Though not shown, other types of connectors (one piece, multiple pieces that are couplable, hooks, pins, screws, etc.) may be formed on tag 300 to allow tag 300 to be coupled to another object. In certain aspects, tag 300 may be formed as part of manufacturing of an object, as further described herein.

Figure 4:
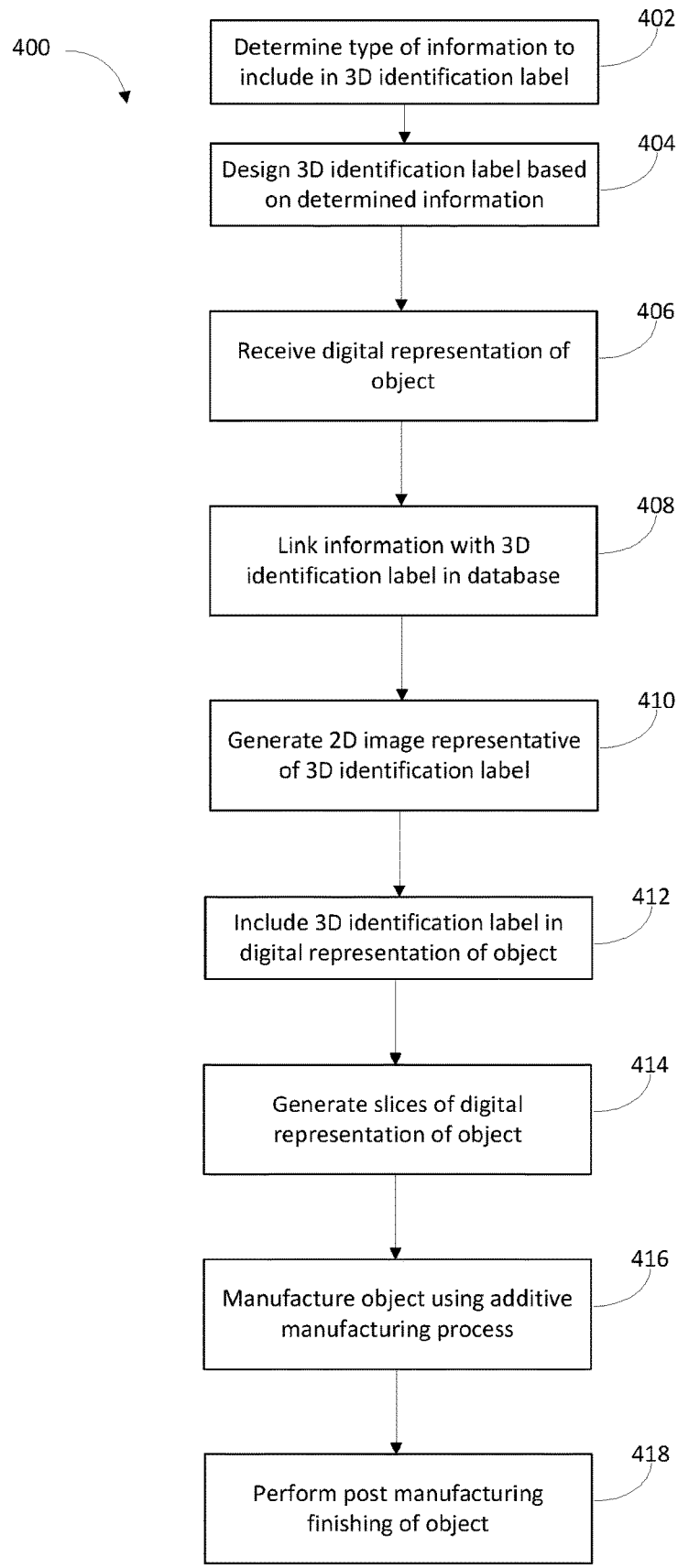
FIG. 4 illustrates a flowchart of an example process for designing and manufacturing a 3D identification label, according to certain aspects.

FIG. 4 illustrates a flowchart of an example process 400 for designing and manufacturing a 3D identification label on an object, according to certain aspects.

At 402, the type of information to include in the 3D identification label is determined. For example, one or more types of information such as an identifier of the object (e.g., unique identifier, serial number, etc.), user of the object, specifications (e.g., color, size, type, etc.) of the object, etc. may be determined. In some aspects, the identifier of the object may be indicative of the other types of information of the object (e.g., linked to the identifier in a database, such as on one or more computing devices). In some aspects, the types of information to include may be selected by or input into a computing device using a user interface. In certain aspects, the actual values for each of the one or more types of information may not yet be determined.

At 404, based on the type of information to include in the 3D identification label, an initial design of the 3D identification label is determined. For example, at least one of an area, size, location on the object, pattern, shape, etc. of the 3D identification label for representing the information, color, material, 1-sided or 2-sided selection, etc. of the 3D identification label is determined. The design may be determined by the computing device (e.g., autonomously).

At 406, a digital representation of the object to include the 3D identification label is received at a computing device. The digital representation may be a voxel, CAD-based, mesh, etc. model, such as a model suitable for use by an additive manufacturing process, as discussed herein. The object may be a customized object for a user (e.g., one or more parts are customized), a generic object, etc. In some aspects, a user selects the object from a catalog. In some aspects, the selected object may be customized (e.g., in design, shape, size, etc.) to the user. The information included in the 3D identification label may be based on the specifications of the selected object, such as the object selected, unique identifier of the object, identification of the user, and/or customization parameters of the object.

At 408, the information represented by the 3D identification label is linked with the 3D identification label (e.g., with the pattern of the 3D identification label) in a database (e.g., in a computing device). In some aspects, a computing device may include a scanner configured to read the 3D identification label, and may also have access to the database (e.g., via a network, stored locally, etc.) and determine the information based on reading the 3D identification label. In some aspects, the information represented by the 3D identification label is linked with an identifier (e.g., unique identifier) of the 3D identification label. In some aspects, the linking of information to a 3D identification label is performed for each object to be labeled.

At 410, a 2D image representative of the 3D identification label is generated based on the information to include in the 3D identification label. For example, the 2D image may be representative of the area, size, pattern, shape, etc. of the 3D identification label, and generated based on the design of the 3D identification label. In certain aspects, 3D surfaces of different heights, areas of different material density, areas of different materials, areas of different coating, etc. may be represented as lines of differing sizes and/or 2D blocks (e.g., rectangles) of different area/dimensions, etc. In some aspects, if the information to include in the 3D identification label is not available or complete at this stage, a generic 2D image (e.g., not representative of the actual pattern to represent data) may be used. The generic 2D image may still have an area and/or size corresponding to the actual 3D identification label. The 2D image may be generated by the computing device (e.g., autonomously). In some aspects, the 2D image is not generated.

At 412, the 3D identification label is included as part of the digital representation of the object in the computing device. In certain aspects, the 3D identification label is included as part of the object itself, so the digital representation of the object includes the 3D identification label as part of the design of the object. Accordingly, a geometry (e.g., at least one of an area, size, location on the object, pattern, shape, etc. of the 3D identification label for representing the information, color, material, 1-sided or 2-sided selection, etc.) of a 3D digital representation of the 3D identification label is determined and included on the digital representation of the object. In some aspects, the geometry of the 3D digital representation of the 3D identification label is generated based on the 2D image of the 3D identification label.

In certain aspects, metadata (e.g., the type of information to include in the 3D identification label but not the actual information itself, or the actual information represented by the 3D identification label or a simplified representation of the geometry, or etc.) representative of the 3D identification label is included at the location in the digital representation of the object where the 3D identification label is to be included. Accordingly, in such aspects, the digital representation of the object does not yet include the 3D identification label as part of the design of the object. This may provide flexibility in that the geometry or design of the 3D identification label need not be generated prior to generating slices of the digital representation of the object, as further discussed herein.

In certain aspects, the 3D identification label is added as a tag (e.g., tag 300) and positioned as part of the digital representation of the object. The tag and object may be manufactured as part of a single manufacturing process (e.g., as attached).

At 414, slices of the digital representation of the object are created by the computing device. For example, where the 3D identification label is included on the digital representation of the object, slices are made of the digital representation of the object. Where only metadata representative of the 3D identification label is included at a location in the digital representation of the object, the geometry of the 3D identification label may be generated (e.g., based on the metadata, the 2D image, etc.) during the slicing process and added to the individual slices of the digital representation of the object. For example, since the change to the digital representation of the object is localized to the location of the 3D identification label, only the surfaces in the slices where the 3D identification label is located are changed. This may provide advantages over including the 3D identification label on the digital representation of the object. For example, the risk of error due to a geometry change of the digital representation of the object is reduced. In addition, the information in the 3D identification label may be changed at a late stage, even up to the time before the object is sliced.

In certain aspects, when the metadata representative of the 3D identification label is processed to generate slice data, the surface at a given location of the object, for example a slice plane, is defined in accordance with the surface contours required to provide the 3D identification label indicated by the metadata. The surface defining data may include data indicative of the surface contours required to provide a specified 3D identification label of a particular shape, size, color, etc. Thus, the metadata is indicative of surface contours of an object to be printed, relative to a surface surrounding the 3D identification label of the object, which contours are representative of 3D identification label indicia of the at least part of the three dimensional object. In this way, the surface data for the object to be printed may be generated to represent surface contours representative of a 3D identification label. By using the metadata to indicate a 3D identification label, an object may be easily printed with a 3D identification label. This is more efficient and gives a reduced data size of data file compared with using a triangular mesh to describe a 3D identification label for example.

At 416, the slices of the digital representation of the object including the 3D identification label are used as part of an additive manufacturing process, as discussed herein, to manufacture the object including the 3D identification label.

At 418, post additive manufacturing processes may be performed on the 3D identification label, such as finishing or polishing to increase contrast, or coating.

Figure 9:
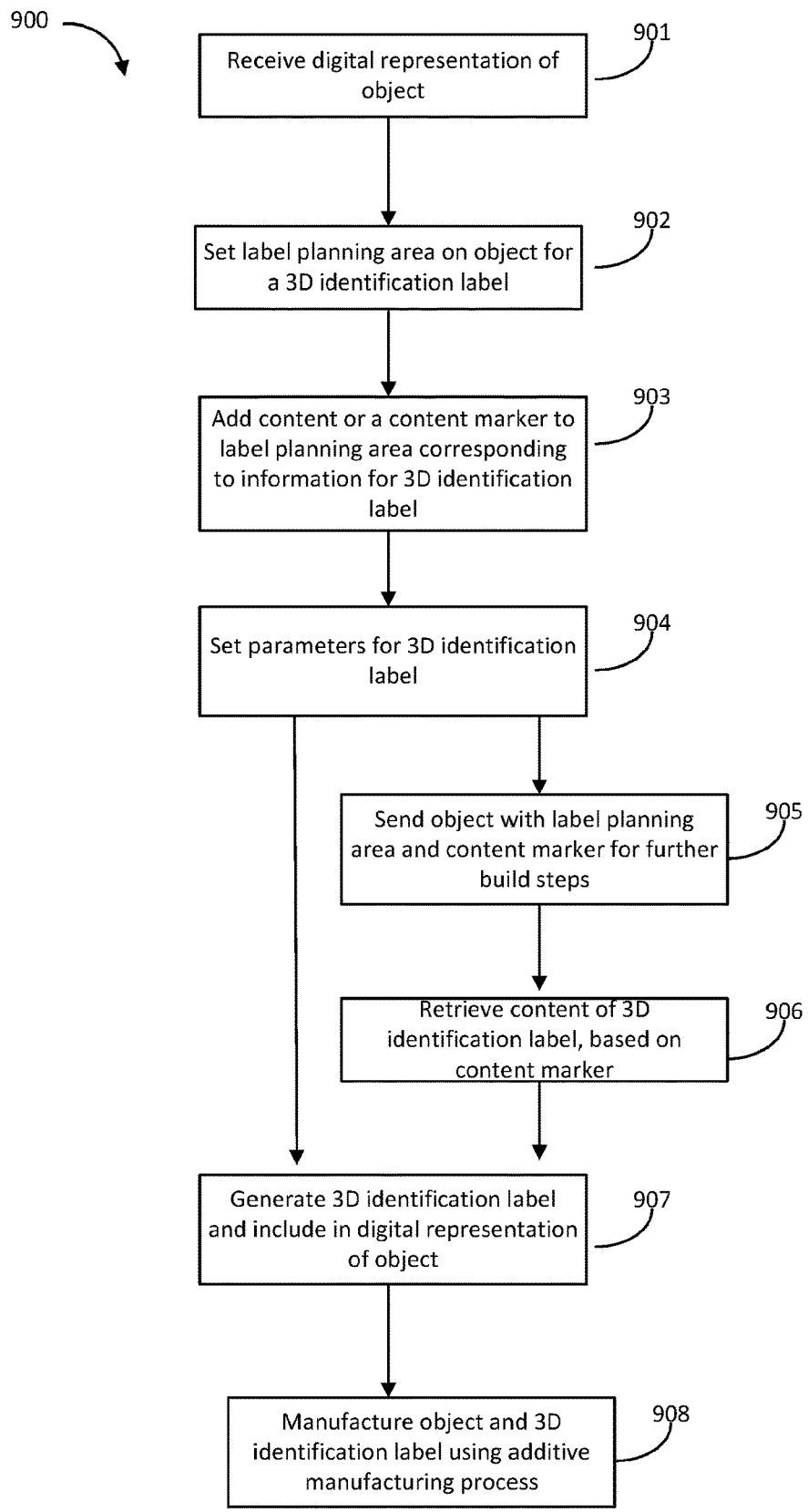
FIG. 9 illustrates a flowchart of a further example process for designing and manufacturing a 3D identification label, according to certain aspects.

FIG. 9 illustrates a flowchart of another example process 900 for designing and manufacturing a 3D identification label on an object, according to certain aspects. The process may be performed by a computing device, for example, in a series of automated steps. In some embodiments, the computing device may be configured to allow a user to perform one or more steps manually.

The computing device may receive a digital representation of an object (901). The object may itself be a part or the object may be a tag, clip, or identifier that will be attached to the part. The computing device may set a label planning area on the object (902), where a 3D identification label will be located. The label planning area may be generated according to features of the object, such as size and geometry. The label planning area may be placed or moved around the object to a desired location, for example, to a location that is not visible on exposed surfaces of the object or to a location that will not interfere with the operation of the object. In some aspects, the label planning area may be placed at a location where a 3D identification label may be easily accessed and read. For example, the label planning area may be located on an upward facing surface of the object. The label planning area may also be modified in size or scaled up or down.

In some aspects, the computing device may access a template of a label planning area that has previously been generated and stored. The computing device may select or configure a label planning area for a given object based on the similarity to another object for which a label planning area was previously set. In certain aspects, a file of an object may be stored with a label planning area on it. This file may be recalled and modified further at a later time. In certain aspects, a library of objects (such as physical clips) may have a defined label planning area already generated in template form on each of the objects. Or, a library of label planning areas may be stored and retrieved. In some embodiments, the computing device is configured to automatically generate a label planning area or retrieve a stored label planning area, place the label planning area on an object, and then modify and store the label planning area. In other embodiments, the computing device is configured to allow a user to generate, retrieve, place, modify, and store the label planning area.

Information for the 3D identification label may be added to the label planning area (903), either in the form of content or as a content marker that links data or information to the label planning area. The data or information may be related to the object, such as unique details of a custom part, identifiers, production data, or more. In some aspects, content represented by a 3D identification label may be stored in storage means such as a database, a list, or a spreadsheet. The computing device may be configured to add content such as text or numerals directly to a label planning area at this step in order to create a 3D identification label. The content may be converted to a printable format including but not limited to STL or 3MF, so that a printable version of the 3D identification label may be included as part of the object. Alternatively, the label planning area may have a content marker instead of actual content, which provides a link between stored data or information and the label planning area. In this case, the data or information may be accessed and the 3D identification label generated in a later step.

The computing device sets parameters for the 3D identification label (904), for example, according to instructions for 3D identification labels in standard label planning areas, or according to individual parameters selected by a user. Parameters may comprise one or more of size of the label planning area, pixel size, number of pixels in the label planning area, limits on number and size of characters or numbers that may be in a 3D identification label, content and source of content for the 3D identification label that will eventually be located in the label planning area, presence of recessed area (e.g., engraving), depth of recess, height of portions of 3D identification label, double sided label planning area for a double sided 3D identification label, and type of 3D identification label (e.g., data matrix, 3D QR code, Aztec, bar code, textured label, color or shadow-based label, combination of label types, or combination with text) and more.

In some embodiments, 903 may be performed before 902, so that parameters for the 3D identification label are determined before content such as text is added directly to the label planning area or before the content marker is linked to the label planning area.

Optionally, the label planning area with or without a 3D identification label may be checked by the computing device or by a user to confirm that the 3D identification label in the label planning area will be configured according to specifications or requirements. In some aspects, the computing device may be configured to add additional label planning areas for 3D identification labels to the object. The computing device may be configured to add additional label planning areas automatically, or may be configured to allow a user to manually add one or more 3D identification labels and/or label planning areas. The computing device may generate a preview of the object with the 3D identification label(s) and label planning area(s).

In some aspects, the object and 3D identification label may be ready for manufacturing. For example, if the content of the 3D identification label has already been added to the object and will be converted to a printable format, then the 3D identification label may be included in a digital representation of the object (907), and then sent to the additive manufacturing device (908).

In certain aspects, the computing device sends a digital representation of the object, together with the label planning area and content marker for the 3D identification label for further build planning, processing and/or preparation steps (together "build steps") before manufacturing (905). For example, content may be retrieved in order to generate a 3D identification label (906). The computing device may retrieve data directly from a database, list, spreadsheet, or storage means, using the content marker. The content may be used to generate the 3D identification label in the label planning area, and the 3D identification label may then be included in the digital representation of the object (907).

In some aspects, the computing device may convert the 3D identification label directly to a printable format such as STL or 3MF. The format may also be a CAD-based, voxel, or mesh model. In certain aspects, the computing device may automatically incorporate the content into cross-sectional slices representing the object and 3D identification label, in a process that applies the 3D identification label during slicing (i.e., slice-based labeling). Either STL or slices may be sent to an additive manufacturing device in order to manufacture the object and 3D identification label using an additive manufacturing process (908).

Figure 5:
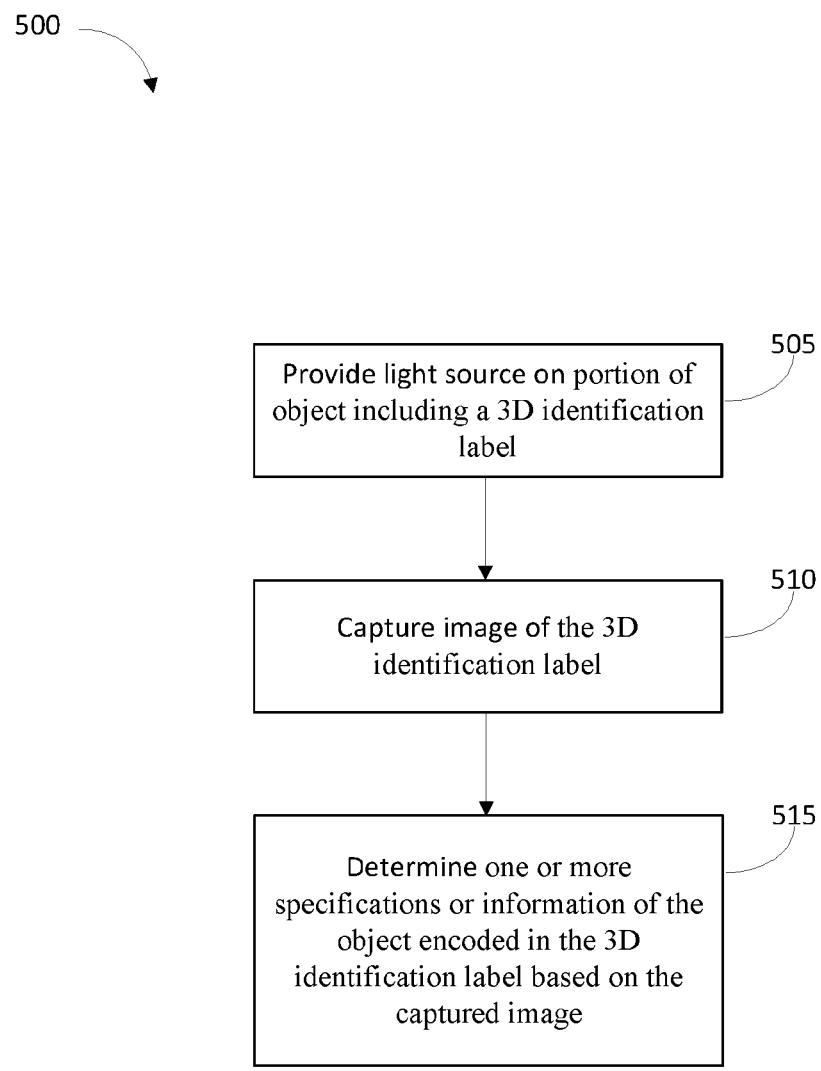
FIG. 5 illustrates a flowchart of an example process for reading a 3D identification label, according to certain aspects.

FIG. 5 illustrates a flowchart of an example process 500 for reading a 3D identification label, according to certain aspects.

At 505, a light source is provided on the portion of the object including the 3D identification label. In some aspects, the light source is provided as a front lighting, as discussed. In some aspects, the light source is provided as a back lighting, as discussed. The light source may be provided as side lighting, or may be front lighting provided at an angle to the 3D identification label. The light source may be provided on a flat surface of the object corresponding to where the 3D identification label is located.

At 510, an image of the 3D identification label is captured (e.g., using a scanning device). For example, where the 3D identification label is backlit, the image is captured from the opposite side of the flat surface as the light source is applied to. Where the 3D identification label is front lit, the image is captured from the same side of the flat surface as the light source is applied to.

At 515, one or more specifications or information of the object encoded in the 3D identification label (e.g., pattern of the 3D identification label) is determined based on the captured image.

Figure 5A:
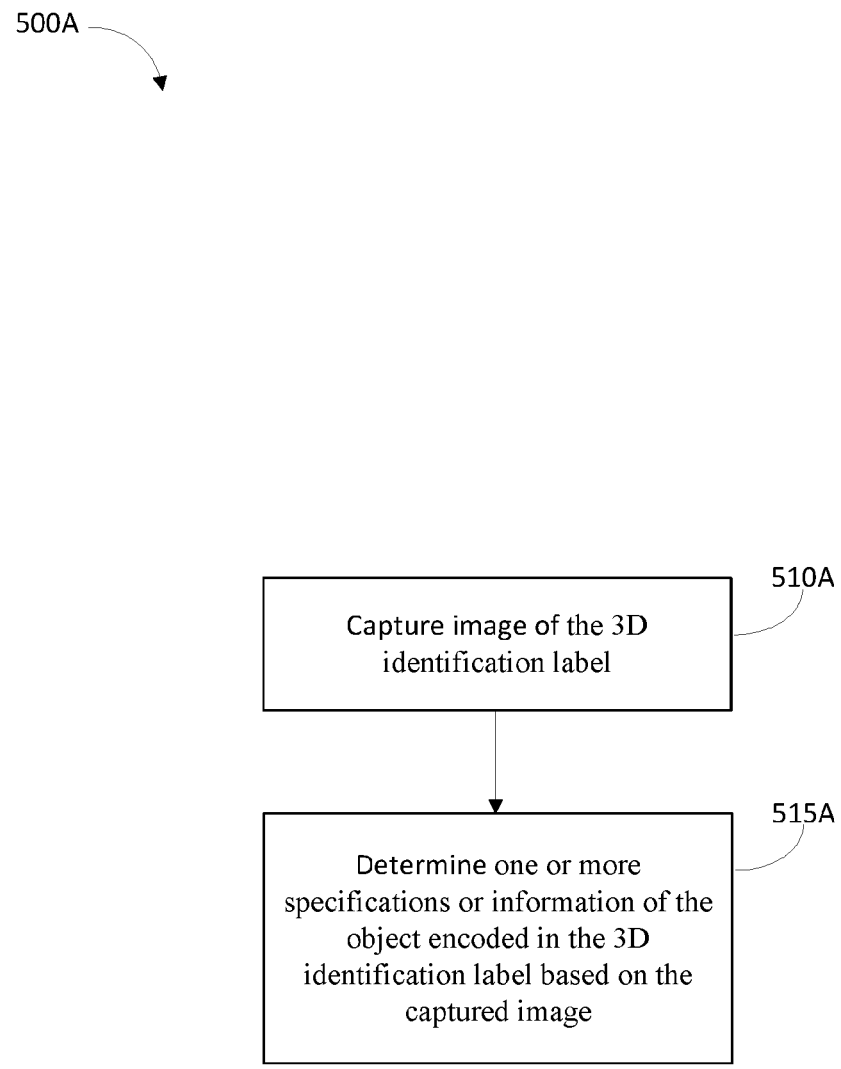
FIG. 5A illustrates a flowchart of an example process for reading a 3D identification label, according to certain aspects.

FIG. 5A illustrates a flowchart of an example process 500A for reading a 3D identification label, according to certain aspects.

At 510A, an image of the 3D identification label is captured that imaged different densities of material of the 3D identification label (e.g., using a suitable scanning device such as an X-ray machine).

At 515A, one or more specifications or information of the object encoded in the 3D identification label (e.g., pattern of the 3D identification label) is determined based on the captured image.

It should be noted that the processes described herein, such as with respect to FIGS. 4, 5, and 5A, are merely representative processes, steps may be added, deleted, changed, moved, etc., in accordance with the aspects discussed herein.

Figure 6:
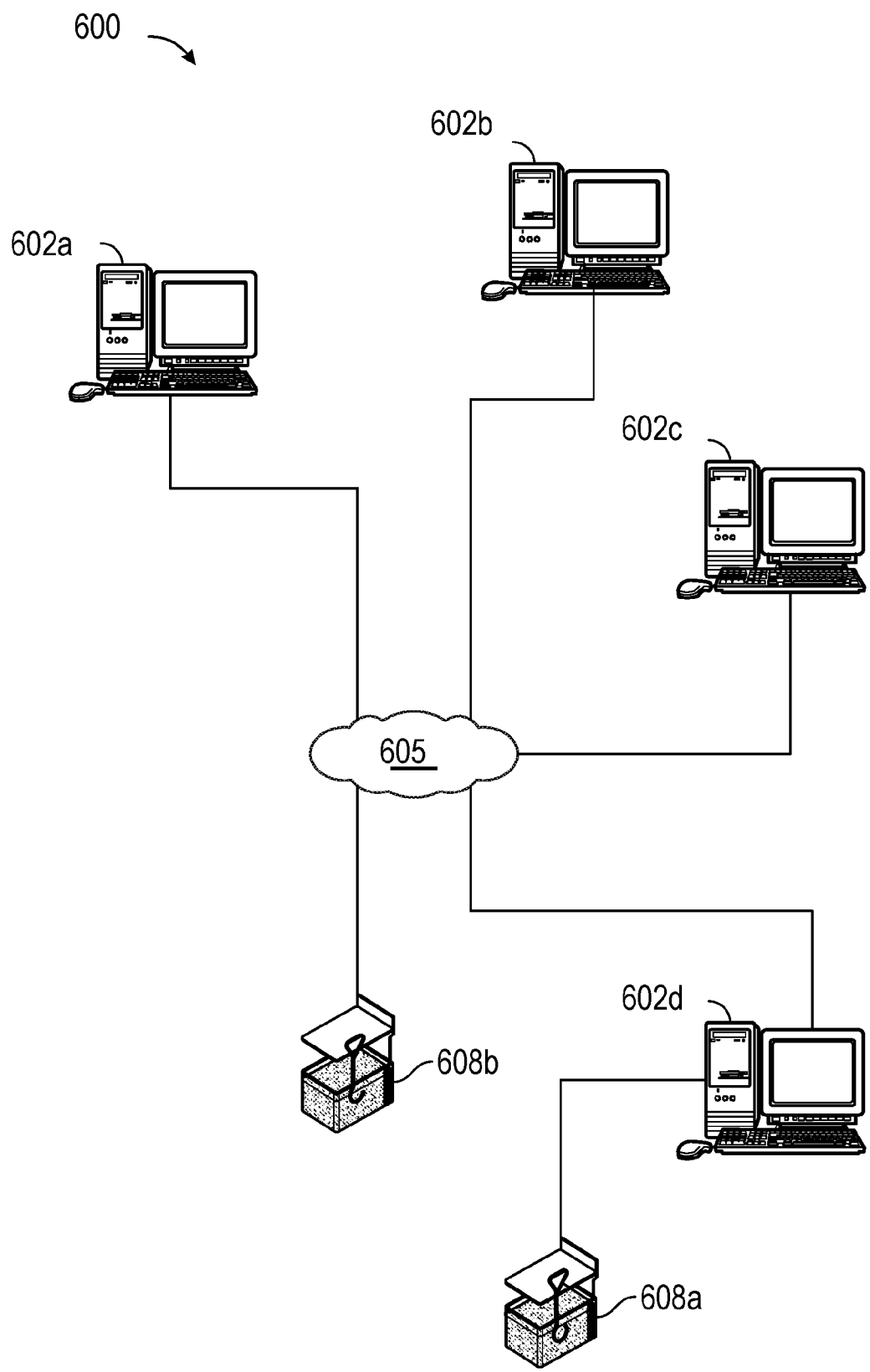
FIG. 6 is an example of a system for designing and manufacturing 3D objects.

Embodiments of the invention may be practiced within a system for designing and manufacturing 3D objects. Turning to FIG. 6, an example of a computer environment suitable for the implementation of 3D object design and manufacturing is shown. The environment includes a system 600. The system 600 includes one or more computers 602*a*-602*d*, which can be, for example, any workstation, server, or other computing device capable of processing information. In some aspects, each of the computers 602*a*-602*d* can be connected, by any suitable communications technology (e.g., an internet protocol), to a network 605 (e.g., the Internet). Accordingly, the computers 602*a*-602*d* may transmit and receive information (e.g., software, digital representations of 3-D objects, commands or instructions to operate an additive manufacturing device, etc.) between each other via the network 605.

The system 600 further includes one or more additive manufacturing devices (e.g., 3-D printers) 608*a*-608*b*. As shown the additive manufacturing device 608*a* is directly connected to a computer 602*d* (and through computer 602*d* connected to computers 602*a*-602*c* via the network 605) and additive manufacturing device 608*b* is connected to the computers 602*a*-602*d* via the network 605. Accordingly, one of skill in the art will understand that an additive manufacturing device 608 may be directly connected to a computer 602, connected to a computer 602 via a network 605, and/or connected to a computer 602 via another computer 602 and the network 605.

It should be noted that though the system 600 is described with respect to a network and one or more computers, the techniques described herein also apply to a single computer 602, which may be directly connected to an additive manufacturing device 608. Any of the computers 602*a*-602*d* may be configured to function as the computing device described with respect to FIGS. 1-5A. Further, any of the computers 602a-602d may be configured to perform the operations described herein, including the operations described with respect to FIGS. 4, 5, and 5A.

Figure 7:
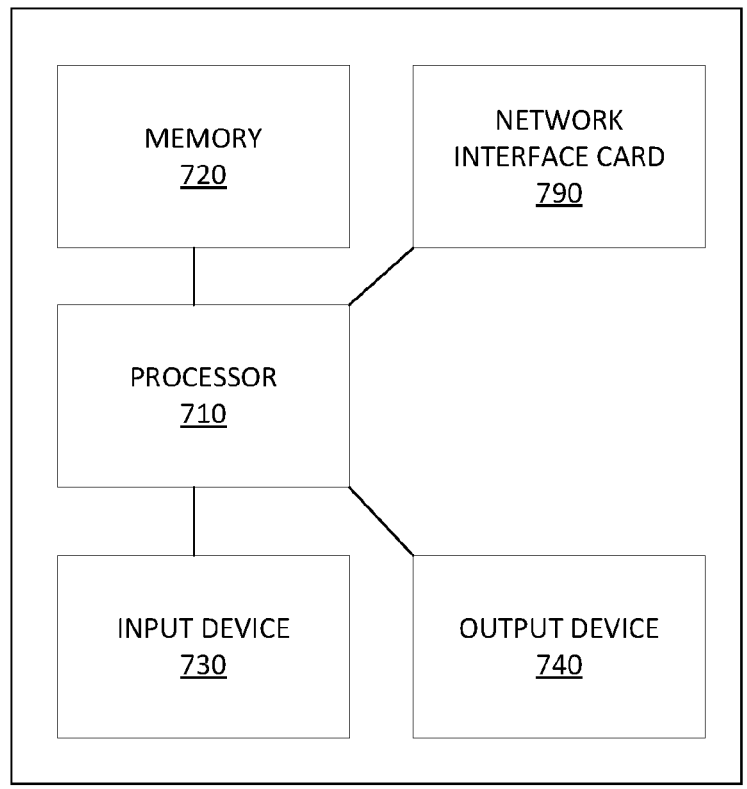
FIG. 7 illustrates a functional block diagram of one example of the computer shown in FIG. 6.

FIG. 7 illustrates a functional block diagram of one example of a computer of FIG. 6. The computer 602a includes a processor 710 in data communication with a memory 720, an input device 730, and an output device 740. In some embodiments, the processor is further in data communication with an optional network interface card 790. Although described separately, it is to be appreciated that functional blocks described with respect to the computer 602a need not be separate structural elements. For example, the processor 710 and memory 720 may be embodied in a single chip.

The processor 710 can be a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration.

The processor 710 can be coupled, via one or more buses, to read information from or write information to memory 720. The processor may additionally, or in the alternative, contain memory, such as processor registers. The memory 720 can include processor cache, including a multi-level hierarchical cache in which different levels have different capacities and access speeds. The memory 720 can also include random access memory (RAM), other volatile storage devices, or non-volatile storage devices. The storage can include hard drives, optical discs, such as compact discs (CDs) or digital video discs (DVDs), flash memory, floppy discs, magnetic tape, and Zip drives.

The processor 710 also may be coupled to an input device 730 and an output device 740 for, respectively, receiving input from and providing output to a user of the computer 602a. Suitable input devices include, but are not limited to, a keyboard, buttons, keys, switches, a pointing device, a mouse, a joystick, a remote control, an infrared detector, a bar code reader, a scanner, a video camera (possibly coupled with video processing software to, e.g., detect hand gestures or facial gestures), a motion detector, or a microphone (possibly coupled to audio processing software to, e.g., detect voice commands). Suitable output devices include, but are not limited to, visual output devices, including displays and printers, audio output devices, including speakers, headphones, earphones, and alarms, additive manufacturing devices, and haptic output devices.

The processor 710 further may be coupled to a network interface card 790. The network interface card 790 prepares data generated by the processor 710 for transmission via a network according to one or more data transmission protocols. The network interface card 790 also decodes data received via a network according to one or more data transmission protocols. The network interface card 790 can include a transmitter, receiver, or both. In other embodiments, the transmitter and receiver can be two separate components. The network interface card 790, can be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein.

Figure 8:
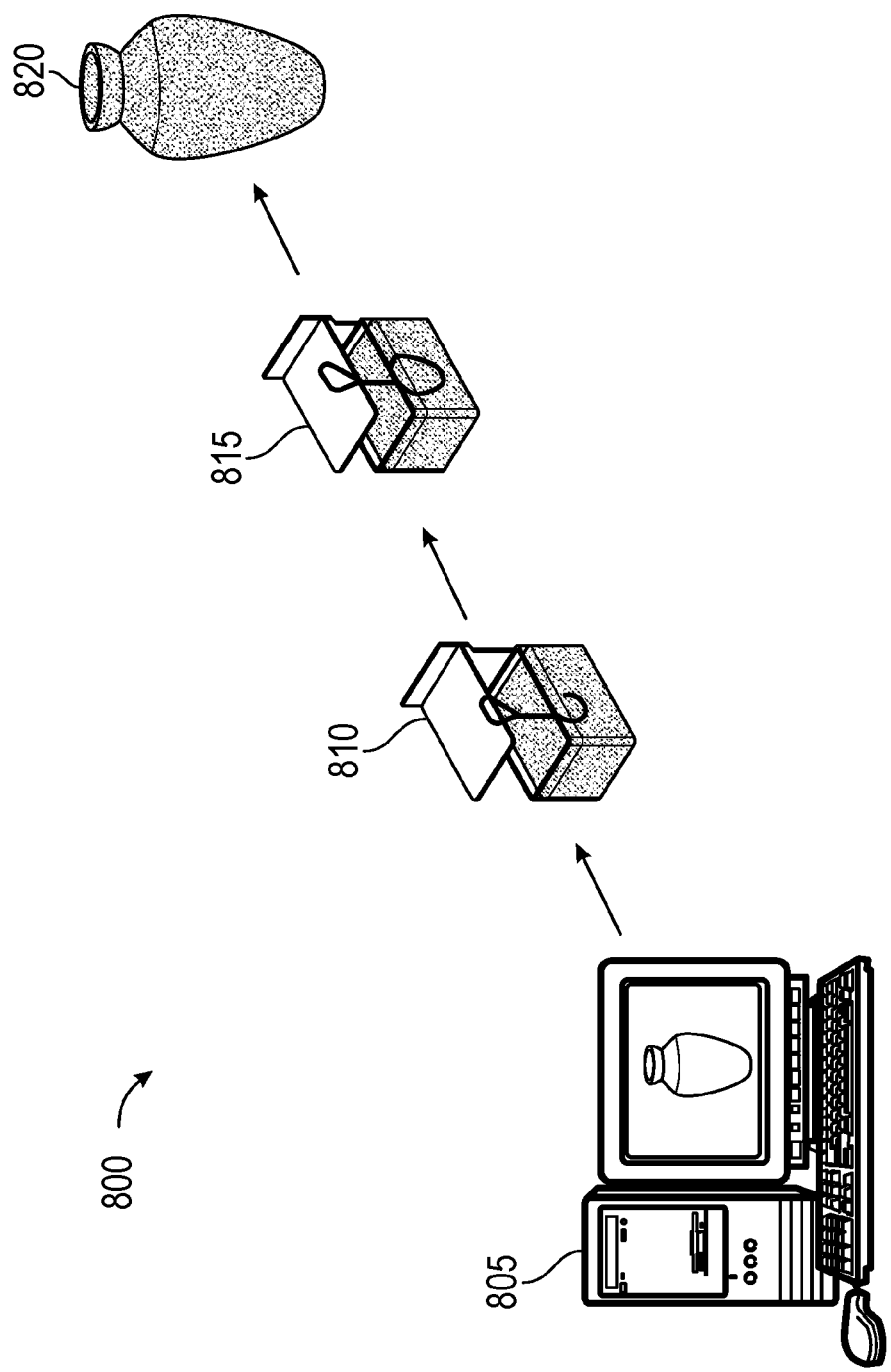
FIG. 8 shows a high-level process for manufacturing a 3D object using an additive manufacturing system.

FIG. 8 illustrates a process 800 for manufacturing a 3-D object or device. As shown, at a step 805, a digital representation of the object is designed using a computer, such as the computer 602a. For example, 2-D or 3-D data may be input to the computer 602a for aiding in designing the digital representation of the 3-D object. Continuing at a step 810, information is sent from the computer 602a to an additive manufacturing device, such as additive manufacturing device 608, and the device 608 commences the manufacturing process in accordance with the received information. At a step 815, the additive manufacturing device 808 continues manufacturing the 3-D object using suitable materials, such as a liquid resin. At a step 820, the object is finally built.

These suitable materials may include, but are not limited to a photopolymer resin, polyurethane, methyl methacrylate-acrylonitrile-butadiene-styrene copolymer, resorbable materials such as polymer-ceramic composites, metals, metal alloys, etc. Examples of commercially available materials are: DSM Somos® series of materials 7100, 8100, 9100, 9420, 10100, 11100, 12110, 14120 and 15100 from DSM Somos; ABSplus-P430, ABSi, ABS-ESDI, ABS-M30, ABS-M30i, PC-ABS, PC ISO, PC, ULTEM 9085, PPSF and PPSU materials from Stratasys; Accura Plastic, DuraForm, CastForm, Laserform and VisiJet line of materials from 3D-Systems; the PA line of materials, PrimeCast and PrimePart materials and Alumide and CarbonMide from EOS GmbH, Aluminum, CobaltChrome and Stainless Steel materials, MarangingSteel, Nickel Alloy, and Titanium. The VisiJet line of materials from 3-Systems may include Visijet Flex, Visijet Tough, Visijet Clear, Visijet HiTemp, Visijet e-stone, Visijet Black, Visijet Jewel, Visijet FTI, etc. Examples of other materials may include Objet materials, such as Objet Fullcure, Objet Veroclear, Objet Digital Materials, Objet Duruswhite, Objet Tangoblack, Objet Tangoplus, Objet Tangoblackplus, etc. Another example of materials may include materials from the Renshape 5000 and 7800 series. Further, at a step 820, the 3-D object is generated.

Various embodiments disclosed herein provide for the use of computer software being executed on a computing device. A skilled artisan will readily appreciate that these embodiments may be implemented using numerous different types of computing devices, including both general-purpose and/or special-purpose computing system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or non-transitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Various embodiments disclosed herein may be implemented using a computer or computer control system. A skilled artisan will readily appreciate that these embodiments may be implemented using numerous different types of computing devices, including both general-purpose and special-purpose computing-system environments or configurations. Examples of well-known computing systems, environments, and/or configurations that may be suitable for use in connection with the embodiments set forth above may include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. These devices may include stored instructions, which, when executed by a microprocessor in the computing device, cause the computer device to perform specified actions to carry out the instructions. As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

Aspects and embodiments of the inventions disclosed herein may be implemented as a method, apparatus or article of manufacture using standard programming or engineering techniques to produce software, firmware, hardware, or any combination thereof. The term "article of manufacture" as used herein refers to code or logic implemented in hardware or nontransitory computer readable media such as optical storage devices, and volatile or non-volatile memory devices or transitory computer readable media such as signals, carrier waves, etc. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

What is claimed is:

1. A method of manufacturing an object using an additive manufacturing process, the method comprising:
   receiving a digital representation of the object;
   setting a label planning area for a 3D identification label on the object;
   adding information to the 3D identification label in the label planning area;
   setting parameters for the 3D identification label; and
   manufacturing the object and 3D identification label, wherein the object comprises:
   a reference surface; and
   the 3D identification label on both a first side and a second side of the reference surface,
   wherein the 3D identification label comprises a first raised surface formed as a pattern on the first side of the reference surface and a second raised surface formed as the pattern on the second side of the reference surface,
   wherein the first side is opposite the second side of the reference surface, and
   wherein each point of the first raised surface on the first side of the reference surface is positioned at the same coordinates in a plane defined by the reference surface as each point of the second raised surface on the second side of the reference surface.

2. The method of claim 1, further comprising modifying at least one of location and size of the label planning area.

3. The method of claim 1, wherein the adding information comprises adding a content marker.

4. The method of claim 3, wherein the content marker provides a link to the information for the 3D identification label to the label planning area.

5. The method of claim 3, further comprising:
   retrieving the information for the 3D identification label based on the content marker; and
   generating a digital representation of the 3D identification label.

6. The method of claim 5, further comprising generating slices of the 3D identification label and sending the slices to an additive manufacturing device.

7. The method of claim 5, further comprising converting the digital representation of the 3D identification label to a printable format and sending the converted digital representation of the 3D identification label to an additive manufacturing device.

8. The method of claim 1, wherein the first raised surface and the second raised surface are substantially more opaque than the reference surface.

9. The method of claim 1, wherein a portion of the reference surface is translucent.

10. A method of reading a 3D identification label on an object, the method comprising:
    providing a backlight on a reference surface of the object, wherein the reference surface comprises the 3D identification label on or under, at least one of a first side and a second side of the reference surface, wherein the 3D identification label is formed as a pattern on or under the first side of the reference surface;
    capturing an image of the 3D identification label from a side of the reference surface opposite a side the backlight is provided on, wherein the backlight passes through the reference surface for capturing the image; and determining one or more specifications of the object encoded in the pattern based on the captured image of the 3D identification label.

11. The method of claim 10, wherein the 3D identification label is further formed as the pattern on the second side of the reference surface, wherein the first side is opposite the second side of the reference surface, wherein each point of the pattern on the first side of the reference surface is positioned at the same coordinates in a plane defined by the reference surface as each point of the pattern on the second side of the reference surface.

12. The method of claim 10, wherein the one or more specifications comprise an identifier of the object.

13. The method of claim 10, wherein the pattern is substantially more opaque than the reference surface.

14. The method of claim 10, wherein a portion of the reference surface is translucent.

15. The method of claim 14, wherein providing the backlight comprises illuminating the reference surface on the side of the reference surface opposite the side the backlight is provided on.

16. The method of claim 10, wherein different portions of the 3D identification label have different densities.

17. An object comprising:
a reference surface; and
a 3D identification label on both a first side and a second side of the reference surface, wherein the 3D identification label comprises a first raised surface formed as a pattern on the first side of the reference surface and a second raised surface formed as the pattern on the second side of the reference surface,
wherein the first side is opposite the second side of the reference surface,
wherein each point of the first raised surface on the first side of the reference surface is positioned at the same coordinates in a plane defined by the reference surface as each point of the second raised surface on the second side of the reference surface, and
wherein the pattern is indicative of an encoding of one or more specifications of the object.

18. An object comprising:
a reference surface; and
a 3D identification label under a first side and a second side of the reference surface,
wherein the 3D identification label comprises a pattern formed under the first side and the second side of the reference surface,
wherein the first side is opposite the second side of the reference surface, and
wherein the pattern is indicative of an encoding of one or more specifications of the object.

19. The object of claim 18, wherein different portions of the 3D identification label have different densities.

* * * * *